C. F. Ritchel,
Can Opener.
N°. 77,916.   Patented May 12, 1868.

Witnesses:
J. B. Finchiy
L. H. Lane

Inventor:
Charles F. Ritchel

United States Patent Office.

CHARLES F. RITCHEL, OF CHICAGO, ILLINOIS.

Letters Patent No. 77,916, dated May 12, 1868.

IMPROVEMENT IN CAN-OPENER.

*The Schedule referred to in these Letters Patent and making part of the same.*

TO ALL WHOM IT MAY CONCERN:

Be it known that I, CHARLES F. RITCHEL, of the city of Chicago, in the county of Cook, and State of Illinois, have invented a new and useful "Can-Opener;" and I do hereby declare that the following is a full and exact description thereof, reference being had to the accompanying drawings making part of this specification, in which—

Figure 1:
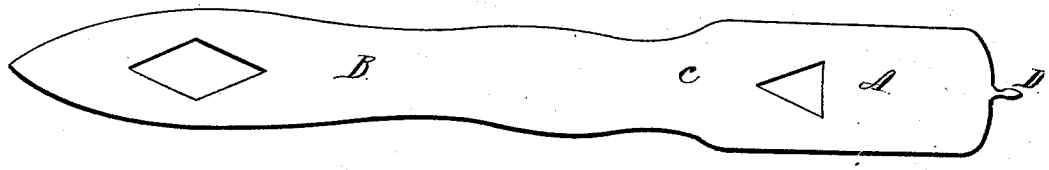

Figure 1 represents the top view of the opener, and

Figure 2:
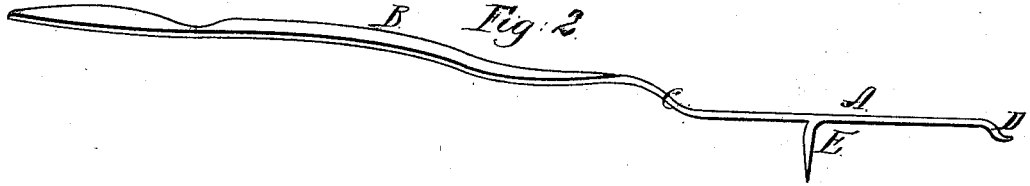

Figure 2 the side elevation of it.

The object of my invention is to provide a cheap and substantial can-opener, not liable to get out of order, and accessible in price to everybody's means; and its nature consists in a tool made of one piece, cut by a die out of sheet metal, and provided with a point to drive it into the can for obtaining a point of rest or fulcrum, and a knife or blade to cut a round opening.

To enable others skilled in the art to make and use my invention, I will proceed to describe its construction and operation.

A is the opener proper, and B the handle, both cut out of one piece of sheet metal, and united by a slight curve, C, for a more convenient handling of the device, the edges of the handle being bent downward, for the purpose of giving an easier hold to the hand, and for offering a stronger resistance to the lateral force applied to it.

D is a sharp point, bent downward, or slightly curved to the front, and E is the knife or blade, of triangular shape, the whole thing, point and blade, being struck out of sheet metal at once by a properly-arranged die, and the point D and the blade E turned off, and trimmed by hand or machinery afterwards, and steel-hardened, if desirable. The manufacturing process, being thus rendered very cheap and rapid, the price of the tool itself becomes very low.

The operation of the opener consists in this, that the tool, being held in a vertical position, the point D is forced into the can, and the handle is brought down, and the fulcrum for the operation of the handle being thus obtained, the blade E is forced into the can also, and the handle B is turned around with one hand, while the can is firmly held with the other hand, the blade E thus cutting round opening in the can.

What I claim as new, and my invention, and desire to secure by Letters Patent, is—

The can-opener, made of one piece of sheet metal, as described, provided with point D and blade E, both arranged and operating substantially as herein shown and specified.

CHARLES F. RITCHEL.

Witnesses:
J. B. TURCHIN,
R. R. FOOTE.